(12) United States Patent
Takasu

(10) Patent No.: US 8,495,909 B2
(45) Date of Patent: Jul. 30, 2013

(54) CYLINDER PRESSURE ESTIMATION DEVICE OF INTERNAL COMBUSTION ENGINE

(75) Inventor: Yusuke Takasu, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/509,928

(22) PCT Filed: Feb. 16, 2010

(86) PCT No.: PCT/JP2010/052590
§ 371 (c)(1),
(2), (4) Date: May 5, 2012

(87) PCT Pub. No.: WO2011/101984
PCT Pub. Date: Aug. 25, 2011

(65) Prior Publication Data
US 2012/0297865 A1      Nov. 29, 2012

(51) Int. Cl.
*G01M 15/08* (2006.01)
(52) U.S. Cl.
USPC ..................................................... 73/114.16
(58) Field of Classification Search
USPC ............... 73/114.16, 114.17, 114.18, 114.22
See application file for complete search history.

(56) References Cited

U.S. PATENT DOCUMENTS

| 7,634,940 | B2 * | 12/2009 | Hartmann et al. | 73/114.37 |
| 7,975,533 | B2 * | 7/2011 | Andrie | 73/114.16 |
| 8,336,374 | B2 * | 12/2012 | Zanotti et al. | 73/114.79 |
| 2008/0236267 | A1 * | 10/2008 | Hartmann et al. | 73/114.37 |
| 2009/0293597 | A1 * | 12/2009 | Andrie | 73/114.16 |
| 2010/0250093 | A1 * | 9/2010 | Howard et al. | 701/103 |

FOREIGN PATENT DOCUMENTS

| JP | A-2002-332885 | 11/2002 |
| JP | A-2004-278359 | 10/2004 |
| JP | A-2005-291146 | 10/2005 |
| JP | A-2005-344513 | 12/2005 |
| JP | A-2006-144696 | 6/2006 |
| JP | A-2007-187064 | 7/2007 |
| JP | A-2008-25404 | 2/2008 |
| JP | A-2009-236093 | 10/2009 |

OTHER PUBLICATIONS

International Search Report mailed Apr. 20, 2010 issued in International Patent Application No. PCT/JP2010/052590 (with translation).

* cited by examiner

*Primary Examiner* — Eric S McCall
(74) *Attorney, Agent, or Firm* — Oliff & Berridge, PLC

(57) ABSTRACT

A cylinder pressure estimation device calculates a plurality of candidate values of a possible cylinder pressure at an intake-valve-closing time, calculates a plurality of candidates of a possible movement of the cylinder pressure from the intake-valve-closing time to a post-intake-valve-closing time on the basis of the candidate values of the intake-valve-closing-time cylinder pressure, calculates a movement of the cylinder pressure detected by the cylinder pressure sensor from the intake-valve-closing time to the post-intake-valve-closing time; and calculates the candidates of the cylinder pressure movement with the detected cylinder pressure movement, determining the candidate of the cylinder pressure movement to be deemed to correspond to the detected cylinder pressure movement and determining the candidate value of the intake-valve-closing-time cylinder pressure used for calculating the determined candidate of the cylinder pressure movement.

14 Claims, 7 Drawing Sheets

CYLINDER PRESSURE ESTIMATION DEVICE OF INTERNAL COMBUSTION ENGINE

TECHNICAL FIELD

The invention relates to a cylinder pressure estimation device of an internal combustion engine.

BACKGROUND ART

An intake air amount estimation device for estimating an amount of an air sucked into a combustion chamber of an internal combustion engine, is disclosed in the Patent Document 1. In this intake air amount estimation device, the intake air amount is estimated by using a model formula which is obtained using physical laws.

In the intake air amount estimation device disclosed in the Patent Document 1, the pressure in the combustion chamber (hereinafter, this pressure will be referred to as —cylinder pressure—) is used in order to estimate the intake air amount. Then, the cylinder pressure includes the cylinder pressure at the time when an intake valve closes. Therefore, in order to exactly estimate the intake air amount in the intake air amount estimation device disclosed in the Patent Document 1, the cylinder pressure at the time when the intake valve closes, should be exactly obtained.

PRIOR ART DOCUMENTS

Patent Document

[Patent Document 1] Unexamined Japanese Patent Publication No. 2004-278359
[Patent Document 2] Unexamined Japanese Patent Publication No. 2005-344513
[Patent Document 3] Unexamined Japanese Patent Publication No. 2008-25404
[Patent Document 4] Unexamined Japanese Patent Publication No. 2002-332885
[Patent Document 5] Unexamined Japanese Patent Publication No. 2005-291146

DISCLOSURE OF THE INVENTION

Problems to be Solved by the Invention

In the intake air amount estimation device disclosed in the Patent Document 1, a flow coefficient regarding the flow of the air around the intake valve is used in order to estimate the intake air amount. Then, the flow coefficient is a parameter relating to the cylinder at the time when the intake valve closes. As explained above, in the intake air amount estimation device disclosed in the Patent Document 1, in order to exactly estimate the intake air amount, it is necessary to exactly obtain the cylinder pressure at the time when the intake valve closes and therefore, the flow efficient which is the parameter relating to the cylinder pressure at the time when the intake valve closes, should be an accurate flow efficient.

However, in order to obtain the sufficiently accurate flow coefficient so as to exactly estimate the intake air amount in the intake air amount estimation device disclosed in the Patent Document 1, the very large work load is necessary. Further, the flow coefficient regarding the flow of the air around the intake valve varies at least, depending on the engine. Therefore, in general, as in the intake air amount estimation device disclosed in the Patent Document 1, it can be said that it is difficult to exactly obtain the cylinder pressure at the time when the intake valve closes, using the flow coefficient regarding the flow of the air around the intake valve and exactly estimate the intake air amount. Then, considering that the intake air amount is the parameter relating to the combustion in the combustion chamber, in general, it can be said that it is difficult to exactly obtain the parameter relating to the combustion in the combustion chamber on the basis of the idea disclosed in the Patent Document 1 and exactly obtain the combustion itself in the combustion chamber on the basis of the idea disclosed in the Patent Document 1.

Therefore, in the prior art, there is a problem that the cylinder pressure at the time when the intake valve closes, cannot be exactly obtained in order to exactly estimate or predict the parameter relating to the combustion in the combustion chamber or exactly estimate or predict the combustion itself in the combustion chamber.

Under the circumstance, the object of the invention is to exactly estimate the cylinder pressure at the time when the intake valve of the engine closes.

Means for Solving the Problems

To accomplish the above-mentioned object, the first invention of this application is a cylinder pressure estimation device of an engine having a cylinder pressure sensor for detecting a pressure in a combustion chamber as a cylinder pressure, comprising:

means for calculating as candidate values of an intake-valve-closing-time cylinder pressure, a plurality of candidate values of a possible pressure in the combustion chamber at an intake-valve-closing time which is a time when an intake valve closes;

means for calculating as candidates of a cylinder pressure movement, a plurality of candidates of a possible movement of the pressure in the combustion chamber from the intake-valve-closing time to a post-intake-valve-closing time which is a time after the intake-valve-closing time by a predetermined time period on the basis of the candidate values of the intake-valve-closing-time cylinder pressure calculated by the intake-valve-closing-time cylinder pressure candidate value calculation means;

means for calculating as a detected cylinder pressure movement, a movement of the cylinder pressure detected by the cylinder pressure sensor from the intake-valve-closing time to the post-intake-valve-closing time; and means for comparing the candidates of the cylinder pressure movement calculated by the cylinder pressure movement candidate calculation means with the detected cylinder pressure movement calculated by the detected cylinder pressure movement calculation means, determining the candidate of the cylinder pressure movement to be deemed to correspond to the detected cylinder pressure movement among the candidates of the cylinder pressure movement and determining as the pressure in the combustion chamber at the intake-valve-closing time, the candidate value of the intake-valve-closing-time cylinder pressure used for calculating the determined candidate of the cylinder pressure movement by the cylinder pressure movement candidate calculation means.

In the first invention of this application, at the time when the intake valve closes (i.e. the intake-valve-closing time), a plurality of the candidate values of the possible pressure in the combustion chamber at this time (i.e. the candidate values of the intake-valve-closing-time cylinder pressure), are calculated. Then, assuming that the pressure in the combustion chamber at the time when the intake valve closes is each of the above-mentioned candidate values, a plurality of the candidates of the pressure movement in the combustion chamber until a certain time period from the time when the intake valve closes is elapsed (i.e. from the intake-valve-closing time to the post-intake-valve-closing time) (i.e. the candidates of the cylinder pressure movement), are calculated. On the other hand, the movement of the pressure in the combustion chamber until the above-mentioned certain time period from the time when the intake valve closes is elapsed (i.e. from the intake-valve-closing time to the post-intake-valve-closing time) (i.e. the detected cylinder pressure movement), is calculated on the pressure in the combustion chamber detected by the cylinder pressure sensor. Then, the calculated detected cylinder pressure movement is compared with the candidates of the cylinder pressure movement and then, the candidate of the cylinder pressure movement to be deemed to correspond to the detected cylinder pressure movement is determined among the candidates of the cylinder pressure movement. Then, the candidate value of the intake-valve-closing-time cylinder pressure used to calculate the determined candidate of the cylinder pressure movement, is determined as the pressure in the combustion chamber at the intake-valve-closing time.

As explained above, in the first invention of this application, without specifying the pressure in the combustion chamber at the time when the intake valve closes, the candidate values of the cylinder pressure at the time when the intake valve closes are calculated. In this regard, among the calculated candidate values of the cylinder pressure, there are ones higher or lower than the actual cylinder pressure at the time when the intake valve closes. However, in other word, it can be said that among the calculated candidate values of the cylinder pressure, there are ones equal to or generally equal to the actual cylinder pressure at the time when the intake valve closes.

Then, in the first invention of this application, the candidates of the movement of the cylinder pressure (i.e. the candidate cylinder pressure movements) until the certain time period from the time when the intake valve closes is elapsed, are calculated, corresponding to the candidate values of the cylinder pressure. In this regard, among the calculated candidates of the cylinder pressure movement, there is a calculated candidate of the cylinder pressure movement which is largely different from the actual movement of the cylinder pressure, while there is a calculated candidate of the cylinder pressure movement which is extremely near the actual movement of the cylinder pressure.

On the other hand, in the first invention of this application, the movement of the cylinder pressure until the certain time period is elapsed from the time when the intake valve closes (i.e. the detected cylinder pressure movement) is calculated on the basis of the cylinder pressure detected by the cylinder pressure sensor until the certain time period is elapsed from the time when the intake valve closes. In this regard, the calculated detected cylinder pressure movement does not completely correspond to the actual movement of the cylinder pressure, however, generally corresponds to the actual movement of the cylinder pressure.

Then, in the first invention of this application, the detected cylinder pressure movement which generally corresponds to the actual movement of the cylinder pressure is compared with the candidates of the cylinder pressure movement and then, the candidate of the cylinder pressure movement to be deemed to correspond to the detected cylinder pressure movement, is determined. That is, according to this, even when there is the cylinder pressure which does not exactly correspond to the actual cylinder pressure among the cylinder pressures detected by the cylinder pressure sensor, the cylinder pressure detected by the cylinder pressure sensor is entirely compared with the candidate of the cylinder pressure movement and therefore, the candidate of the cylinder pressure movement determined as the candidate of the cylinder pressure movement to be deemed to correspond to the detected cylinder pressure movement, is extremely near the actual movement of the cylinder pressure.

Then, in the first invention of this application, the candidate value of the cylinder pressure used to calculate the thus determined candidate of the cylinder pressure movement, is determined as the actual cylinder pressure at the time when the intake valve closes. That is, the candidate of the cylinder pressure movement determined as explained above is extremely near the actual movement of the cylinder and therefore, the candidate value of the cylinder pressure used to calculate the determined candidate of the cylinder pressure movement, is extremely near the actual cylinder pressure at the time when the intake valve closes.

Therefore, according to the first invention of this application, the pressure in the combustion chamber at the time when the intake valve closes, is exactly determined.

Further, in order to accomplish the above-mentioned object, the second invention of this application is a cylinder pressure estimation device of an engine having a cylinder pressure sensor for detecting a pressure in a combustion chamber as a cylinder pressure, comprising:

means for calculating as candidate values of an intake-valve-closing-time cylinder pressure, a plurality of candidate values of a possible pressure in the combustion chamber at an intake-valve-closing time which is a time when an intake valve closes;

means for calculating as candidate values of a post-intake-valve-closing cylinder pressure, a plurality of candidate values of a possible pressure in the combustion chamber at a post-intake-valve-closing time which is a time after the intake-valve-closing time by a predetermined time period on the basis of the candidate values of the intake-valve-closing-time cylinder pressure calculated by the intake-valve-closing-time cylinder pressure candidate value calculation means; and means for comparing the candidate values of the post-intake-valve-closing-time cylinder pressure calculated by the post-intake-valve-closing-time cylinder pressure candidate value calculation means with a cylinder pressure detected as a post-intake-valve-closing-time cylinder pressure by the cylinder pressure sensor at the post-intake-valve-closing time, determining the candidate value of the post-intake-valve-closing-time cylinder pressure to be deemed to correspond to the post-intake-valve-closing-time cylinder pressure among the candidate values of the post-intake-valve-closing-time cylinder pressure and determining as the pressure in said combustion chamber at the intake-valve-closing time, the candidate value of the intake-valve-closing-time cylinder pressure used for calculating the determined candidate value of the intake-valve-closing-time cylinder pressure by the post-intake-valve-closing-time cylinder pressure candidate value calculation means.

In the second invention of this application, at the time when the intake valve closes (i.e. the intake-valve-closing time), a plurality of the candidate values of the possible pressure in the combustion chamber (i.e. the candidate values of the intake-valve-closing-time cylinder pressure) are calculated. Then, assuming that the pressure in the combustion chamber at the time when the intake valve closes, corresponds to the candidate values, respectively, a plurality of the candidate values of the pressure in the combustion chamber when a certain time period is elapsed from the time when the intake valve closes (i.e. the intake-valve-closing time) (i.e. the candidate values of the post-intake-valve-closing-time cylinder pressure), are calculated. Then, the calculated candidate values of the post-intake-valve-closing-time cylinder pressure are compared with the cylinder pressure detected by the cylinder pressure sensor at the intake-valve-closing time and then, the candidate value of the post-intake-valve-closing-time cylinder pressure to be deemed to correspond to the detected cylinder pressure, is determined among the candidate values of the post-intake-valve-closing-time cylinder pressure. Then, the candidate value of the intake-valve-closing-time cylinder pressure used to calculate the determined post-intake-valve-closing-time cylinder pressure value, is determined as the pressure in the combustion chamber at the intake-valve-closing time.

As explained above, in the second invention of this application, the pressure in the combustion chamber (i.e. the cylinder pressure) at the when the intake valve closes, is not specified and the candidate values of the cylinder pressure at the time when the intake valve closes, are calculated. In this regard, among the calculated candidate values of the cylinder pressure, there are candidate values higher than the actual cylinder pressure at the time when the intake valve closes, while there are candidate values lower than the actual cylinder pressure at the time when the intake valve closes. However, in other words, among the candidate values of the calculated cylinder pressure, it can be said that there is a candidate value corresponding or generally corresponding to the actual cylinder pressure at the time when the intake valve closes.

Then, in the second invention of this application, the cylinder pressure detected by the cylinder pressure sensor at the certain time period is elapsed from the time when the intake valve closes, is compared with the candidate values of the post-intake-valve-closing-time cylinder pressure and then, the candidate value of the post-intake-valve-closing-time cylinder pressure to be deemed to correspond to the detected cylinder pressure, is determined. That is, at the post-intake-valve-closing time, the cylinder pressure is relatively high and therefore, the cylinder pressure sensor can detect a cylinder pressure which relatively exactly corresponds to the actual cylinder pressure. Therefore, the post-intake-valve-closing-time cylinder pressure which is determined as the candidate value of the post-intake-valve-closing-time cylinder pressure to be deemed to correspond to the cylinder pressure detected by the cylinder pressure sensor at the post-intake-valve-closing time, is extremely near the actual cylinder pressure.

Then, in the second invention of this application, the candidate value of the cylinder pressure used to calculate the thus determined candidate value of the post-intake-valve-closing-time cylinder pressure, is determined as the actual cylinder pressure at the time when the intake valve closes. That is, the candidate value of the post-intake-valve-closing-time cylinder pressure determined as explained above, is extremely near the actual cylinder pressure and therefore, it can be said that the candidate value of the cylinder pressure used to calculate this candidate value of the post-intake-valve-closing-time cylinder pressure, is also extremely near the actual pressure at the time when the intake valve closes.

Therefore, according to the second invention, the pressure in the combustion chamber at the time when the intake valve closes, is exactly determined.

Further, in order to accomplish the above-mentioned object, in the first or second invention, the third invention of this application is the cylinder pressure estimation device, wherein the device further comprises means for calculating as a lower limit of the intake-valve-closing-time cylinder pressure, the pressure in the combustion chamber at an pre-intake-valve-closing time which is a time before said intake-valve-closing time by a predetermined time period and calculating as an upper limit of said intake-valve-closing-time cylinder pressure, the pressure in said combustion chamber at said intake-valve-closing time assuming that said intake valve closes at said pre-intake-valve-closing time, and said intake-valve-closing-time cylinder pressure candidate value calculation means calculates as said candidate values of the intake-valve-closing-time cylinder pressure, the pressures between said lower and upper limits calculated by said upper and lower limit calculation means.

In the third invention of this application, the pressure in the combustion chamber at the time (i.e. the pre-intake-valve-closing time) before the time when the intake valve closes (i.e. the intake-valve-closing time) by the predetermined time period, are set to the lower limit of the intake-valve-closing-time cylinder pressure and the candidate values of the pressure in the combustion chamber at the time when the intake valve closes (i.e. the candidate values of the intake-valve-closing-time cylinder pressure), are set as the pressures higher than the lower limit of the intake-valve-closing-time cylinder pressure. In this regard, the pressure in the combustion chamber at the pre-intake-valve-closing time is assuredly lower than the pressure in the combustion chamber at the intake-valve-closing time. Therefore, when the candidate values of the intake-valve-closing-time cylinder pressure are set as the pressure higher than the lower limit of the intake-valve-closing-time cylinder pressure, there is a candidate value among the set candidate values, which corresponds or generally corresponds to the actual pressure in the combustion chamber at the intake-valve-closing time.

On the other hand, in the third invention of this application, the pressure in the combustion chamber at the intake-valve-closing time assuming that the intake valve closes at the time (i.e. the pre-intake-valve-closing time) before the time when the intake valve closes (i.e. the intake-valve-closing time) by the predetermined time period, is set to the upper limit of the intake-valve-closing cylinder pressure and then, the candidate values of the pressure in the combustion chamber at the time when the intake valve closes (i.e. the candidate values of the intake-valve-closing-time cylinder pressure), are set as the pressure lower than the upper limit of the intake-valve-closing-time cylinder pressure. In this regard, the pressure in the combustion chamber at the intake-valve-closing time assuming the intake valve closes at the pre-intake-valve-closing time, is assuredly higher than the pressure in the combustion chamber at the intake-valve-closing time. Therefore, when the candidate values of the intake-valve-closing-time cylinder pressure are set as the pressure lower than the upper-limit of the intake-valve-closing-time cylinder pressure, there is a candidate value among the set candidate values, which corresponds or generally corresponds to the actual pressure in the combustion chamber at the intake-valve-closing time.

Therefore, according to the third invention of this application, among the candidate values of the intake-valve-closing-time cylinder pressure calculated as the possible pressure in the combustion chamber at the time when the intake valve closes, there is assuredly a candidate value which corresponds or generally corresponds to the actual pressure in the combustion chamber at the time when the intake valve closes.

Then, according to this, the pressure in the combustion chamber at the time when the intake valve closes, is exactly determined.

Further, in order to accomplish the above-mentioned object, in the third invention, the fourth invention of this application is the cylinder pressure estimation device, wherein said engine further has an intake pressure sensor for detecting as an intake pressure, a pressure of an air which flows into said combustion chamber, and said upper and lower limit calculation means calculates as said lower limit, the intake pressure detected by said intake pressure sensor at said pre-intake-valve-closing-time.

In the fourth invention of this application, the lower limit of the intake-valve-closing-time cylinder pressure is set using the intake pressure detected by the intake pressure sensor at the time (i.e. the pre-intake-valve-closing time) before the time when the intake valve closes by the predetermined time period. In this regard, at the time before the intake valve closes, the pressure in the combustion chamber is equal or generally equal to the pressure of the air which is sucked into the combustion chamber. Therefore, the intake pressure detected by the intake pressure sensor at the pre-intake-valve-closing time is equal or generally equal to the pressure in the combustion chamber at this time. On the other hand, the intake pressure detected by the intake pressure sensor can be used for a purpose other than the purpose of the calculation of the lower limit of the intake-valve-closing-time cylinder pressure in the invention. Therefore, according to the invention, the lower limit of the intake-valve-closing-time cylinder pressure can be calculated by the relatively simple constitution.

Further, in order to accomplish the above-mentioned object, in the third or fourth invention, the fifth invention of this application is the cylinder pressure estimation device, wherein said pre-intake-valve-closing time is the intake bottom dead center.

In the fifth invention of this application, the intake bottom dead center is set to the pre-intake-valve-closing time. Therefore, according to this, the intake pressure detected by the intake pressure sensor which is set to the lower limit of the intake-valve-closing-time cylinder pressure is the intake pressure detected by the intake pressure sensor at the intake bottom dead center and the intake-valve-closing time (i.e. the time when the intake valve closes) is the time before the intake bottom dead center. In this regard, the air in the combustion chamber is at least compressed from the intake bottom dead center to the intake-valve-closing time, while the intake valve opens. Further, even if the air is not compressed in the combustion chamber from the intake bottom dead center to the intake-valve-closing time, the pressure in the combustion chamber at the intake-valve-closing time is not lower than the pressure in the combustion chamber at the intake bottom dead center. That is, the intake pressure detected by the intake pressure sensor at the intake bottom dead center is equal to or lower than the pressure in the combustion chamber at the intake-valve-closing time. Therefore, according to the invention, the pressure lower than or equal to the actual pressure in the combustion chamber at the intake-valve-closing time is assuredly set to the lower limit of the intake-valve-closing-time cylinder pressure. Then, according to this, the pressure in the combustion chamber at the time when the intake valve closes, is more assuredly determined.

Further, in order to accomplish the above-mentioned object, in any of the first to fifth inventions, the sixth invention of this application is the cylinder pressure estimation device as set forth in the claims, wherein said engine has a fuel injector for directly injecting a fuel into said combustion chamber and said post-intake-valve-closing time is a time before the fuel is injected from said fuel injector into said combustion chamber.

According to the sixth invention of this application, the time before the fuel is injected from the fuel injector to the combustion chamber, is set to the post-intake-valve-closing time (i.e. the time when a certain time period is elapsed from the time when the intake valve close). Thus, in the case that the candidates of the cylinder pressure movement (i.e. the candidates of the movement of the cylinder pressure until a certain time period is elapsed from the time when the intake valve closes), are calculated, the candidates of the cylinder pressure movement until the time before the time when the fuel is injected from the fuel injector into the combustion chamber, are calculated and in the case that the candidate values of the post-intake-valve-closing-time cylinder pressure (i.e. the candidate values of the pressure in the combustion chamber at the post-intake-valve-closing time), are calculated, the candidate values of the post-intake-valve-closing-time cylinder pressure at the time before the time when the fuel is injected from the fuel injector into the combustion chamber, are calculated.

After the fuel is injected from the fuel injector into the combustion chamber, the combustion of the fuel occurs in the combustion chamber and therefore, if the time when the fuel is injected from the fuel injector into the fuel injector or the time thereafter is set to the post-intake-valve-closing time, the combustion of the fuel should be considered when the cylinder pressure necessary to calculate the candidates of the cylinder pressure movement are calculated or when the candidate values of the post-intake-valve-closing-time cylinder pressure are calculated. However, this increases the load of the calculation of the candidates of the cylinder pressure movement or the candidate values of the post-intake-valve-closing-time cylinder pressure.

According to the sixth invention of this application, the time before the fuel is injected from the fuel injector into the combustion chamber, is set to the post-intake-valve-closing time and therefore, it is unnecessary to consider the combustion of the fuel when the cylinder pressure necessary to calculate the candidates of the cylinder pressure movement are calculated or when the candidate values of the post-intake-valve-closing-time cylinder pressure are calculated. Thus, according to the invention, the candidates of the cylinder pressure movement or the candidate values of the post-intake-valve-closing-time cylinder pressure, are calculated with the relatively low load.

Further, in order to accomplish the above-mentioned object, in any of the first and third to sixth inventions, the seventh invention of this application is the cylinder pressure estimation device, wherein said cylinder pressure movement candidate calculation means calculates a plurality of the candidates of the cylinder pressure movement by a parallel calculation.

According to the seventh invention of this application, the candidates of the cylinder pressure movement are calculated by the parallel calculation. According to this, all candidates of the cylinder pressure movement can be calculated for the relatively short time and therefore, all candidates of the cylinder pressure movement can be assuredly calculated by the post-intake-valve-closing time.

Further, in order to accomplish the above-mentioned object, in any of the second to sixth inventions, the eighth invention of this application is the cylinder pressure estimation device as set forth in the claims, wherein said post-intake-valve-closing-time cylinder pressure candidate value calculation means calculates a plurality of the candidate values of the post-intake-valve-closing-time cylinder pressure by a parallel calculation.

According to the eighth invention of this application, the candidate values of the post-intake-valve-closing-time cylinder pressure are calculated by the parallel calculation. According to this, all candidate values of the post-intake-valve-closing-time cylinder pressure can be calculated for the relatively short time and therefore, all candidate values of the post-intake-valve-closing-time cylinder pressure can be assuredly calculated by the post-intake-valve-closing time.

MODE FOR CARRYING OUT THE INVENTION

Figure 1:
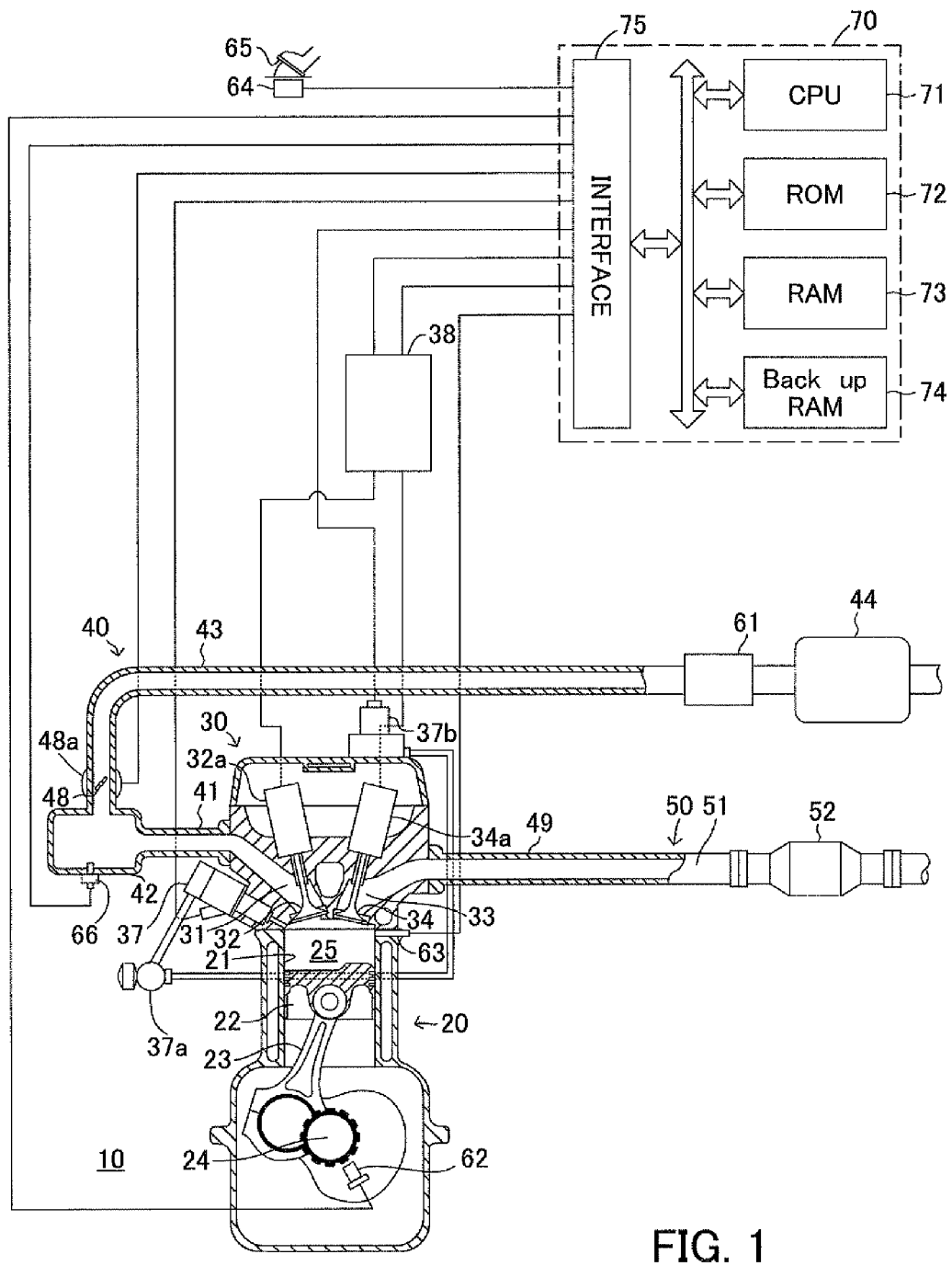
FIG. 1 is a view of an internal engine which the cylinder pressure estimation device of the invention applies.

Below, referring to the drawings, embodiments of cylinder pressure estimation devices of the invention will be explained. An internal combustion engine which a cylinder pressure estimation device of the invention is applied, is shown in FIG. 1. In FIG. 1, 10 denotes a compression self-ignition type of the internal combustion engine (hereinafter, will be referred to as —engine—). The engine 10 comprises a cylinder block part 20 including a cylinder block, a cylinder block lower case, an oil pan, etc., a cylinder head part 30 secured on the cylinder block part 20, an intake passage 50 for supplying an air to the cylinder block part 20 and an exhaust passage 50 for discharging an exhaust gas from the cylinder block part 20 to the exterior.

The cylinder block part 20 has cylinders 21, pistons 22, connection rods 23 and crank shafts 24. The piston 22 moves reciprocally in the cylinder 21, the reciprocal movement of the piston 22 is transmitted to the crank shaft 24 via the connection rod 23 and thereby, the crank shaft 24 is rotated. A combustion chamber 25 is formed by an inner wall face of the cylinder 21, an upper wall face of the piston 22 and a lower wall face of the cylinder head part 30.

The cylinder head part 30 has intake ports 31 each of which communicates with the respective combustion chamber 25, intake valves 32 each of which opens and closes the respective intake port 31, an intake valve drive mechanism 32a which drives the intake valves 32, exhaust ports 33 each of which communicates with the respective combustion chamber 25, exhaust valves 34 each of which opens and closes the respective exhaust port 33, an exhaust valve drive mechanism 34a which drives the exhaust valves 34, fuel injectors 37 each of which injects a fuel into the respective combustion chamber 25, an accumulation chamber 37a which supplies the fuel to the fuel injectors 37 at a high pressure and a fuel pump 37b which pumps the fuel to the accumulation chamber 37a. The intake and exhaust valve drive mechanisms 32a and 34a are connected to a drive circuit 38.

The intake passage 40 has an intake manifold 41 connected to the intake ports 31, a surge tank 42 connected to the intake manifold 41 and an intake duct 43 connected to the surge tank 42. An intake pressure sensor 66 is arranged on the surge tank 42 for detecting a pressure in the surge tank 42 (i.e. a pressure of an air sucked into the combustion chambers 25) as an intake pressure. An air filter 44 and a throttle valve 48 are arranged in the intake duct 43 in the order from the upstream end thereof. The throttle valve 48 is mounted rotatably in the intake duct 43 and is driven by an actuator 48a for driving the throttle valve.

The exhaust passage 50 has an exhaust manifold 49 connected to the exhaust ports 33 and an exhaust pipe 51 connected to the exhaust manifold 49. An exhaust gas purification catalyst 52 is arranged in the exhaust pipe 51 for purifying the components included in an exhaust gas.

The engine 10 further comprises an airflow meter 61 which detects a flow rate of the air flowing in the intake duct 43, a crank position sensor 62 which detects a rotation phase of a crank shaft 24 (i.e. a crank angle), a cylinder pressure sensors 63 each of which detects a pressure in the respective combustion chamber 25 (hereinafter, the pressure will be referred to as —cylinder pressure—), an accelerator opening degree sensor 64 which detects a depression amount of an accelerator pedal 65 and an electronic control unit (ECU) 70. The crank position sensor 62 outputs a narrow pulse every the crank shaft 24 rotates by 1 degree and outputs a wide pulse every the crank shaft 24 rotates by 360 degrees. The engine speed can be calculated on the basis of the pulses output from the crank position sensor 62.

The electronic control unit (ECU) 70 is constituted by a microcomputer and has a CPU (a microprocessor) 71, a ROM (a read only memory) 72, a RAM (a random access memory) 73, a back-up RAM 74 and an interface 75 including AD converter, which are connected to each other by a bidirectional bus. The airflow meter 61, the crank position sensor 62, the cylinder pressure sensor 63 and the accelerator opening degree sensor 64 are connected to the interface 75.

In the above-explained engine 10, the cylinder pressure estimation device of the invention estimates the pressure in the combustion chamber 25 at the time of the closing of the intake valve 32 as follows (hereinafter, the above-mentioned pressure will be referred to as —intake-valve-closing-time cylinder pressure—and the above-mentioned time will be referred to as —intake-valve-closing time—).

Figure 2:
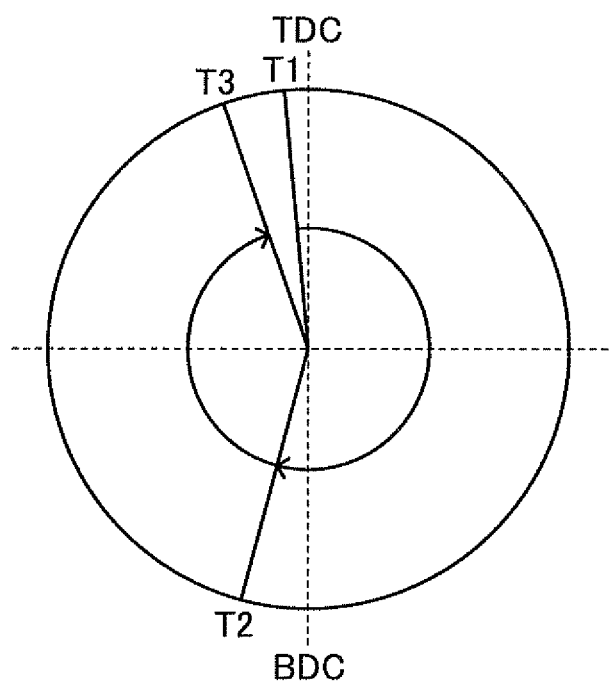
FIG. 2 is a view showing an operation of an intake valve.

That is, in the engine 10, as shown in FIG. 2, the intake valve 32 is driven by the intake valve drive mechanism 32a such that the intake valve 32 opens at the time T1 just before the intake top dead center TDC (hereinafter, this time will be referred to as —intake-valve-opening time—) and closes at the time T2 just after the intake bottom dead center BDC (hereinafter, this time will be referred to as —intake-valve-closing time—). When the intake valve 32 opens at the intake-valve-opening time T1, the air flows into the combustion chamber 25 via the intake port 31. On the other hand, when the intake valve 32 closes at the intake-valve-closing time T2, the inflow of the air into the combustion chamber 25 via the intake port 31 is stopped. Therefore, the intake-valve-closing-time cylinder pressure estimated by the cylinder pressure estimation device of the invention is the pressure in the combustion chamber 25 at the intake-valve-closing time T2.

Then, in an embodiment (hereinafter, will be referred to as —first embodiment—) of the cylinder pressure estimation device of the invention, at first, the intake pressure detected by the intake pressure sensor 66 at the intake bottom dead center BDC is acquired. In this regard, since the intake valve 32 opens at the intake bottom dead center BDC and thus, it can be deemed that the cylinder pressure at this time is generally equal to the pressure in the surge tank 42, it can be said that the intake pressure detected by the intake pressure sensor 66 at the intake bottom dead center BDC is the cylinder pressure at the intake bottom dead center BDC.

Next, in the engine 10, the intake valve 32 does not close at the intake bottom dead center BDC, however, assuming that the intake valve 32 closes at the intake bottom dead center BDC, the possible cylinder pressure at the intake-valve-closing time T2 is calculated by the theoretical calculation on the basis of the acquired intake pressure.

In this regard, the pressure in the combustion chamber 25 at the time when the intake valve 32 actually closes (i.e. the intake-valve-closing-time cylinder pressure), will be considered. The time when the intake valve 32 actually closes (Le, the intake-valve-closing time T2) is the time after the intake bottom dead center BDC). Therefore, from the intake bottom dead center BDC to the intake-valve-closing time, the intake valve 32 opens, however, the air in the combustion chamber 25 is at least compressed. Further, even if the air in the combustion chamber 25 is not compressed from the intake bottom dead center BDC to the intake-valve-closing time T2, the cylinder pressure at the intake-valve-closing time T2 is at least equal to or higher than that at the intake bottom dead center BDC. Thus, it can be said that the intake-valve-closing-time cylinder pressure is at least equal to or higher than the cylinder pressure at the intake bottom dead center BDC. Therefore, the intake-valve-closing-time cylinder pressure is equal to or higher than the intake pressure detected and acquired by the intake pressure sensor 66 at the intake bottom dead center BDC as explained above.

On the other hand, if the intake valve 32 closes at the intake bottom dead center BDC, the air in the combustion chamber 25 is compressed from the intake bottom dead center BDC to the intake-valve-closing time T2. Thus, the cylinder pressure at the intake-valve-closing time T2 assuming the intake valve 32 closes at the intake bottom dead center BDC, is higher than or at least equal to the cylinder pressure in the case that the intake valve 32 closes at the intake-valve-closing time T2 (i.e. the intake-valve-closing-time cylinder pressure). Therefore, the intake-valve-closing-time cylinder pressure is equal to or lower than the cylinder pressure calculated by the theoretical calculation on the basis of the intake pressure acquired as the cylinder pressure at the intake-valve-closing time T2 assuming the intake valve 32 closes at the intake bottom dead center BDC as explained above.

Therefore, in the first embodiment, the intake-valve-closing-time cylinder pressure is equal to or higher than the intake pressure detected and acquired by the intake pressure sensor 66 at the intake bottom dead center BDC and is equal to or lower than the cylinder pressure calculated by the theoretical calculation on the basis of the intake pressure acquired as the cylinder pressure at the intake-valve-closing time T2 assuming the intake valve 32 closes at the intake bottom dead center BDC.

In the first embodiment, the intake pressure detected and acquired by the intake pressure sensor 66 at the intake bottom dead center BDC is set as a lower limit of the intake-valve-closing-time cylinder pressure, while the cylinder pressure calculated by the theoretical calculation on the basis of the intake pressure acquired as the cylinder pressure at the intake-valve-closing time T2 assuming the intake valve 32 closes at the intake bottom dead center BDC, is set as an upper limit of the intake-valve-closing-time cylinder pressure. Then, the predetermined number of the various pressures between the lower and upper limits of the intake-valve-closing-time cylinder pressure are calculated as the candidate values, regarding the intake-valve-closing-time cylinder pressure.

Figure 3:
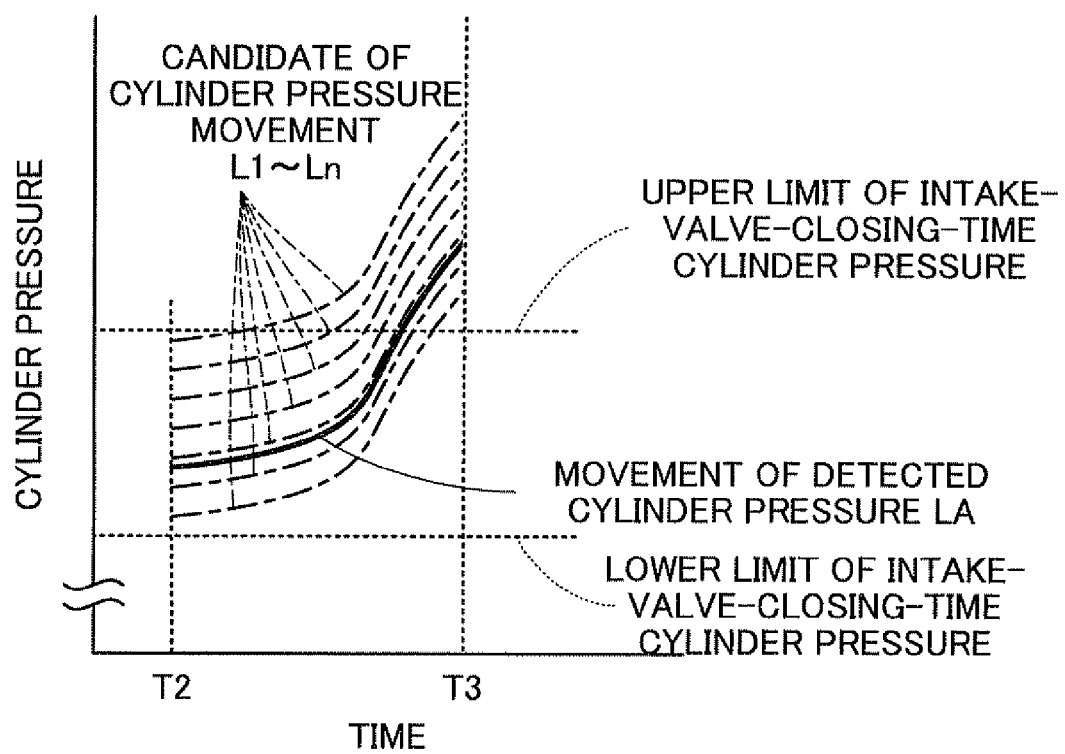
FIG. 3 is a view for explaining a comparison of a transition of the cylinder pressure with options of the transition of the cylinder pressure according to the first embodiment.

Then, when the time (in the first embodiment, the time T3 shown in FIG. 2) immediately before the time when the fuel is injected into the combustion chamber 25 from the fuel injector 37 (hereinafter, the time when the fuel is injected, will be referred to as —fuel injection time—) after the predetermined period from the intake-valve-closing time, will be referred to as —post-intake-valve-closing time—, the possible movement of the cylinder pressure from the intake-valve-closing time T2 to the post-intake-valve-closing time T3 is calculated as the candidates of the movement of the cylinder pressure (hereinafter, the candidate of the movement will be referred to as —candidate of the cylinder pressure movement—) from the intake-valve-closing time T2 to the post-intake-valve-closing time T3 by the theoretical calculation on the basis of the predetermined number of the candidate values of the intake-valve-closing-time cylinder pressure calculated as explained above. That is, thereby, as shown in FIG. 3, a plurality of the candidates L1-Ln of the cylinder pressure movement are theoretically calculated. It should be noted that a plurality of the candidates of the cylinder pressure movement are calculated in the simultaneous parallel manner (i.e. by the parallel calculation).

On the other hand, as shown in FIG. 3, the movement LA of the cylinder pressure from the intake-valve-closing time T2 to the post-intake-valve-closing time T3 (hereinafter, this movement will be referred to as —detected cylinder pressure movement—) is calculated on the basis of the cylinder pressures detected by the cylinder pressure sensor 63 from the intake-valve-closing time T2 to the post-intake-valve-closing time T3.

Then, a plurality of the candidates L1-Ln of the cylinder pressure movement calculated theoretically as explained above are compared with the detected cylinder pressure movement LA calculated as explained above and then, one of the candidates of the cylinder pressure movement which can be deemed to correspond to the detected cylinder pressure movement LA, is determined. Then, the candidate value of the intake-valve-closing-time cylinder pressure used to theoretically calculate the determined candidate of the cylinder pressure movement, is determined as the intake-valve-closing-time cylinder pressure.

Thus, according to the first embodiment, the intake-valve-closing-time cylinder pressure, that is, the pressure in the combustion chamber 25 at the time when the intake valve 32 closes, is estimated.

The intake-valve-closing-time cylinder pressure is also detected by the cylinder pressure sensor 63. Therefore, without estimating the intake-valve-closing-time cylinder pressure as explained above, it may be sufficient to determine the cylinder pressure detected by the cylinder pressure sensor 63 at the intake-valve-closing time T2 as the intake-valve-closing-time cylinder pressure. However, for the following reason, the cylinder pressure detected by the cylinder pressure sensor 63 at the intake-valve-closing time T2 does not correspond exactly to the actual intake-valve-closing-time cylinder pressure.

That is, in general, the cylinder pressure sensor 63 can detect the high pressure with the high accuracy. In other words, in general, the cylinder pressure sensor 63 may not detect the low pressure with the high accuracy. Then, the cylinder pressure at the intake-valve-closing time T2 is relatively low and therefore, the cylinder pressure sensor 63 may not exactly detect the cylinder pressure at the intake-valve-closing time T2. For the reason, the cylinder pressure detected by the cylinder pressure sensor 63 at the intake-valve-closing time T2 does not exactly correspond to the actual intake-valve-closing-time cylinder pressure.

Further, as explained above, in the first embodiment, the movement of the cylinder pressure from the intake-valve-closing time T2 to the post-intake-valve-closing time T3 (i.e. the detected cylinder pressure movement) is calculated on the basis of the cylinder pressure detected by the cylinder pressure sensor 63 from the intake-valve-closing time T2 to the post-intake-valve-closing time T3. The large part (in particular, the last half in term of time) of the cylinder pressure which constitutes the thus calculated detected cylinder pressure movement, is relatively high. Therefore, the large part of the thus calculated detected cylinder pressure movement corresponds to the actual cylinder pressure movement.

In the first embodiment, the highly possible candidates of the cylinder pressure movement are theoretically calculated and one of the candidates of the cylinder pressure movement which can be deemed to correspond to the detected cylinder pressure movement, is determined as the actual cylinder pressure movement from a plurality of the thus calculated candidates of the cylinder pressure movement. As explained above, the large part of the detected cylinder pressure movement corresponds to the actual cylinder pressure movement and therefore, it can be said that the thus determined cylinder pressure movement exactly indicates the actual cylinder pressure movement. Therefore, it can be said that the intake-valve-closing-time cylinder pressure used to theoretically calculate the thus determined cylinder pressure movement also exactly indicates the actual intake-valve-closing-time cylinder pressure. Thus, according to the first embodiment, the intake-valve-closing-time cylinder pressure can be exactly estimated.

Further, in the first embodiment, when the candidate of the cylinder pressure movement which can be deemed to correspond to the detected cylinder pressure movement, is determined, for example, the least-square method is used. That is, in this case, the candidate of the cylinder pressure movement which is deemed to be approximate to the detected cylinder pressure movement using the least-square method, is determined as the actual cylinder pressure movement.

Figure 4:
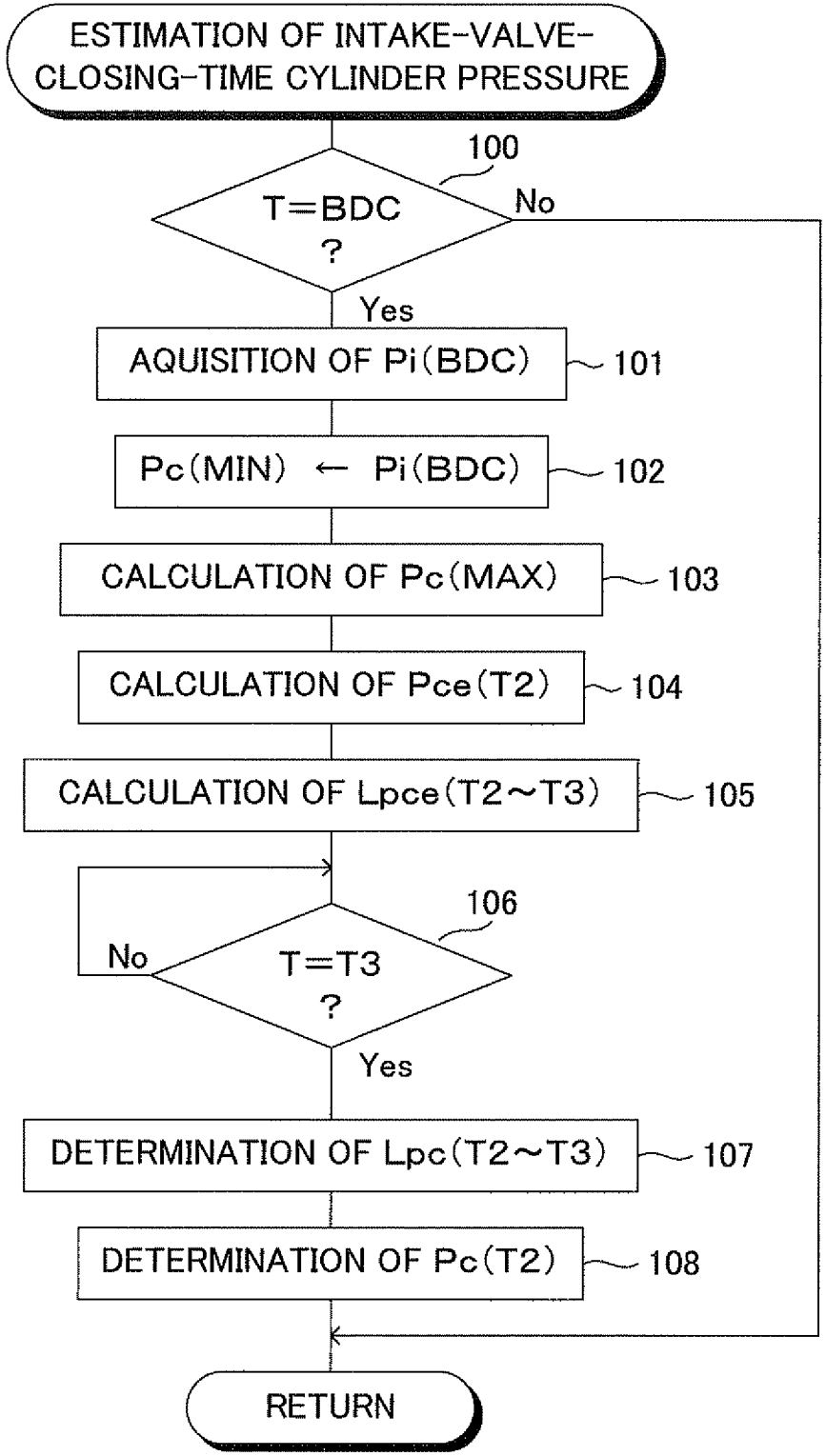
FIG. 4 is a view showing a flowchart for performing an estimation of the intake-valve-closing-time cylinder pressure according to the first embodiment.
Figure 5:
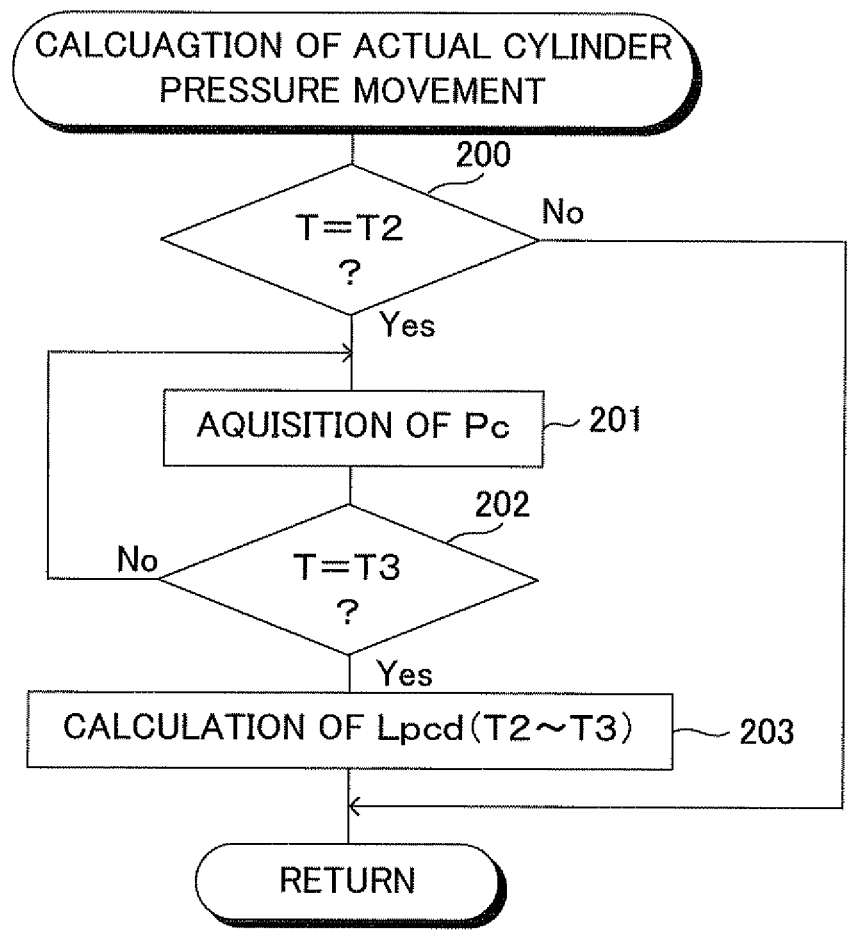
FIG. 5 is a view showing a flowchart for performing a calculation of the transition of the detected cylinder pressure according to the first embodiment.

Next, an example of the routine for performing the estimation of the intake-valve-closing-time cylinder pressure according to the first embodiment, will be explained. For the estimation of the intake-valve-closing-time cylinder pressure according to the first embodiment, for example, the flowcharts shown in FIGS. 4 and 5 are used. The routines of FIGS. 4 and 5 are performed every a predetermined time period is elapsed.

When the routine of FIG. 4 starts, at the step 100, it is judged if the present time T is the intake bottom dead center BDC (T=BDC). In this regard, when it is judged that T=BDC, the routine proceeds to the step 101. On the other hand, when it is not judged that T=BDC, the routine is directly terminated.

When it is judged that T=BDC at the step 100 and then, the routine proceeds to the step 101, the intake pressure Pi(BDC) detected by the intake pressure sensor 66 is acquired. That is, the intake pressure Pi(BDC) detected by the intake pressure sensor 66 is acquired at the intake bottom dead center BDC. Next, at the step 102, the intake pressure Pi(BDC) acquired at the step 101 is set as the lower limit Pc(MIN) of the intake-valve-closing-time cylinder pressure. Next, at the step 103, the upper limit Pc(MAX) of the intake-valve-closing-time cylinder pressure is calculated by the theoretical calculation on the basis of the intake pressure Pi(BDC) acquired at the step 101. Next, at the step 104, the pressures between the lower limit Pc(MIN) set at the step 102 and the upper limit Pc(MAX) calculated at the step 103 of the intake-valve-closing-time cylinder pressure, are calculated as the candidate values Pce(T2) of the intake-valve-closing-time cylinder pressure (i.e. the cylinder pressures at the intake-valve-closing time T2). Next, at the step 105, the candidates Lpce(T2-T3) of the possible movement of the cylinder pressure (i.e. the candidates of the cylinder pressure movement) between the intake-valve-closing time T2 and the post-intake-valve-closing time T3 are calculated by the theoretical calculation on the basis of the candidate values Pce(T2) of the intake-valve-closing-time cylinder pressure calculated at the step 104.

Next, at the step 106, it is judged if the present time T is the post-intake-valve-closing time T3 (T=T3). In this regard, when it is judged that T=T3, the routine proceeds to the step 107. On the other hand, when it is not judged that T=T3, the routine performs the step 106 again. That is, the routine repeatedly performs the step 106 until it is judged that T=T3 at the step 106.

When it is judged that T=T3 at the step 106 and then, the routine proceeds to the step 107, the candidates Lpce(T2-T3) of the cylinder pressure movement calculated at the step 105 is compared with the detected cylinder pressure movement Lpcd(T2-T3) calculated by the routine of FIG. 5 and then, the candidate Lpce(T2-T3) of the cylinder pressure movement which can be deemed to correspond to the detected cylinder pressure movement Lpcd(T2-T3), is determined as the actual cylinder pressure movement Lpc(T2-T3) between the intake-valve-closing time T2 and the post-intake-valve-closing time T3. Next, at the step 108, the candidate value Pce(T2) of the intake-valve-closing-time cylinder pressure used to calculate the actual cylinder pressure movement Lpc(T2-T3) determined at the step 107, is determined as the actual intake-valve-closing-time cylinder pressure Pc(T2) and then, the routine is terminated.

When the routine of FIG. 5 starts, at the step 200, it is judged if the present time T is the intake-valve-closing time T2 (T=T2). In this regard, when it is judged that T=T2, the routine proceeds to the step 201. On the other hand, when it is not judged that T=T2, the routine is directly terminated.

When it is judged that T=T2 at step 200 and then, the routine proceeds to the step 201, the cylinder pressure Pc detected by the cylinder pressure sensor 63 is acquired.

Next, at the step 202, it is judged if the present time T is the post-intake-valve-closing time T3 (T=T3). In this regard, it is judged that T=T3, the routine proceeds to the step 203. On the other hand, when it is not judged that T=T3, the routine repeatedly performs the step 201. That is, the routine repeatedly performs the step 201 until it is judged that T=T3 at the step 202. Thereby, the cylinder pressure Pc detected by the cylinder pressure sensor 63 from the intake-valve-closing time T2 to the post-intake-valve-closing time T3, is acquired.

When it is judged that T=T3 at the step 202 and then, the routine proceeds to the step 203, the movement Lpcd(T"-T3) of the cylinder pressure detected by the cylinder pressure sensor 63 from the intake-valve-closing time T2 to the post-intake-valve-closing time T3 (i.e. the detected cylinder pressure movement), is calculated on the basis of the cylinder pressure Pc acquired at the step 201 and then, the routine is terminated. It should be noted that the detected cylinder pressure movement Lpcd(T2-T3) calculated at the step 203 is used at the step 108 of the routine of FIG. 4.

In the above-explained engine 10, the cylinder pressure estimation device of the invention may estimate the intake-valve-closing-time cylinder pressure as follows.

That is, in this embodiment (hereinafter, this embodiment will be referred to as —second embodiment—), the intake pressure detected by the intake pressure sensor 66 at the intake bottom dead center BDC is acquired. As explained above, since the intake valve 32 opens at the intake bottom dead center BDC and it can be deemed that the cylinder pressure at this time is generally equal to the pressure in the surge tank 42, it can be said that the intake pressure detected by the intake pressure sensor 66 at the intake bottom dead center BDC is the cylinder pressure at the intake bottom dead center BDC.

Next, the intake valve 32 does not close actually at the intake bottom dead center BDC, however, the possible cylinder pressure at the intake-valve-closing time T2 assuming the intake valve 32 closes at the intake bottom dead center BDC, is calculated by the theoretical calculation on the basis of the acquired intake pressure.

As explained relating to the first embodiment, in the second embodiment, the intake-valve-closing-time cylinder pressure is equal to or higher than the intake pressure detected and acquired by the intake pressure sensor 66 at the intake bottom dead center BDC and is equal to or lower than the cylinder pressure calculated by the theoretical calculation on the intake pressure acquired as the cylinder pressure at the intake-valve-closing time T2 assuming the intake valve 32 closes at the intake bottom dead center BDC.

In this regard, in the second embodiment, the intake pressure detected and acquired by the intake pressure sensor 66 at the intake bottom dead center BDC, is set as the —lower limit of the intake-valve-closing-time cylinder pressure—, while the cylinder pressure calculated by the theoretical calculation on the basis of the intake pressure acquired as the possible cylinder pressure at the intake-valve-closing time T2 assuming the intake valve 32 closes at the intake bottom dead center BDC, is set as the —upper limit of the intake-valve-closing-time cylinder pressure. Then, the predetermined number of the various pressures among the pressures between the lower and upper limits of the intake-valve-closing-time cylinder pressure, are calculated as the candidate values of the intake-valve-closing-time cylinder pressure.

Figure 6:
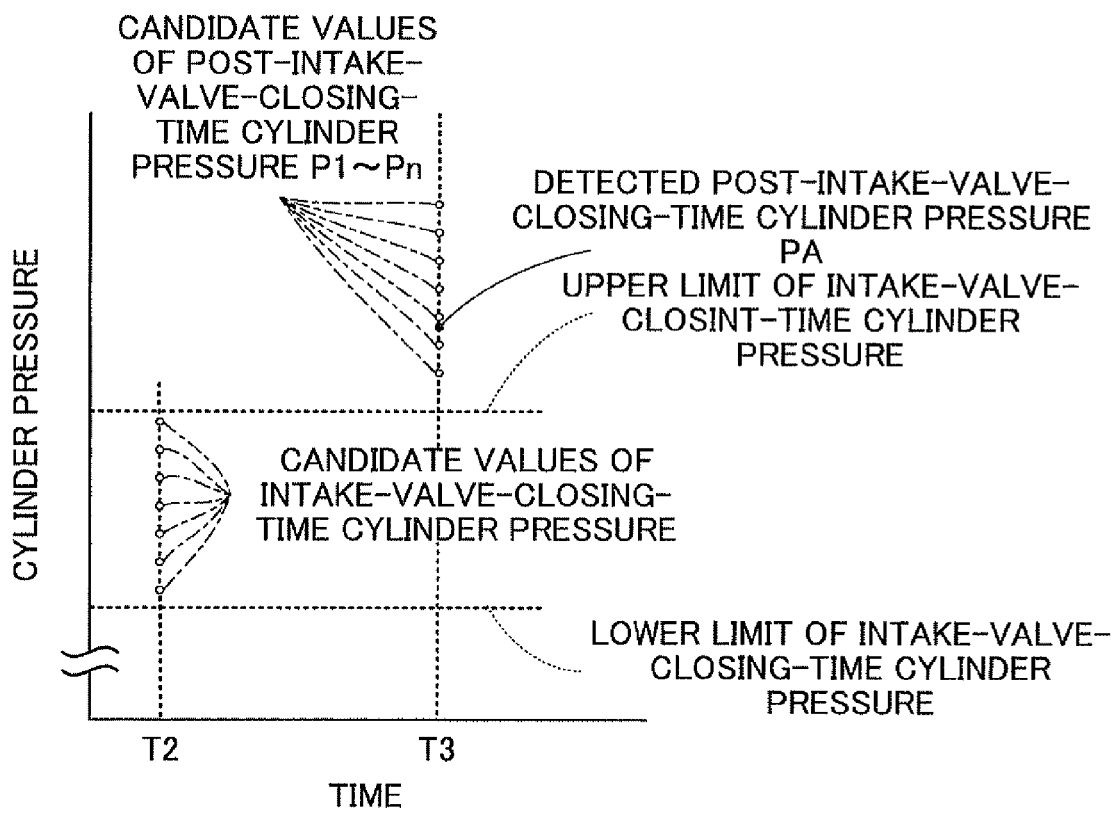
FIG. 6 is a view for explaining a comparison of the detected post-intake-valve-closing-time cylinder pressure with the candidate values of the post-intake-valve-closing-time cylinder pressure according to the second embodiment.

Then, the possible cylinder pressure at the post-intake-valve-closing time (i.e. the time after the predetermined time period from the intake-valve-closing time T2 and immediately before the fuel is injected into the combustion chamber 25 from the fuel injector 37) T3, is calculated as the candidate values of the cylinder pressure at the post-intake-valve-closing time T3 (hereinafter, this candidate value will be referred to as —candidate value of the post-intake-valve-closing-time cylinder pressure—) by the theoretical calculation on the basis of the predetermined number of the intake-valve-closing-time cylinder pressures calculated as explained above. That is, thereby, as shown in FIG. 6, a plurality of the candidate values P1-Pn of the post-intake-valve-closing-time cylinder pressure are calculated theoretically. It should be noted that at this time, the candidate values of the post-intake-valve-closing-time cylinder pressure are calculated in the simultaneous parallel manner (i.e. by the parallel calculation).

On the other hand, as shown in FIG. 6, the cylinder pressure detected by the cylinder pressure sensor 63 at the post-intake-valve-closing time T3 is acquired as the cylinder pressure PA at the post-intake-valve-closing time T3 (hereinafter, this cylinder pressure will be referred to as —detected post-intake-valve-closing-time cylinder pressure—).

Then, the candidate values of the post-intake-valve-closing-time cylinder pressure theoretically calculated as explained above, are compared with the detected post-intake-valve-closing-time cylinder pressure acquired as explained above and then one of the candidate value of the post-intake-valve-closing-time cylinder pressure which can be deemed to correspond to the detected post-intake-valve-closing-time cylinder pressure, is determined. Then, the candidate value of the intake-valve-closing-time cylinder pressure used to theoretically calculate the thus determined candidate value of the post-intake-valve-closing-time cylinder pressure, is determined as the intake-valve-closing-time cylinder pressure.

Thus, according to the second embodiment, the intake-valve-closing-time cylinder pressure, that is, the pressure in the combustion chamber 25 at the time when the intake valve 32 closes, is determined.

Further, for the same reason as that explained relating to the first embodiment, it can be said that the determined post-intake-valve-closing-time cylinder pressure of the second embodiment exactly indicates the actual post-intake-valve-closing-time cylinder pressure. Therefore, it can be said that the intake-valve-closing-time cylinder pressure used to theoretically calculate the determined post-intake-valve-closing-time cylinder pressure of the second embodiment exactly indicates the actual intake-valve-closing-time cylinder pressure. Thus, according to the second embodiment, the intake-valve-closing-time cylinder pressure can be exactly estimated.

Figure 7:
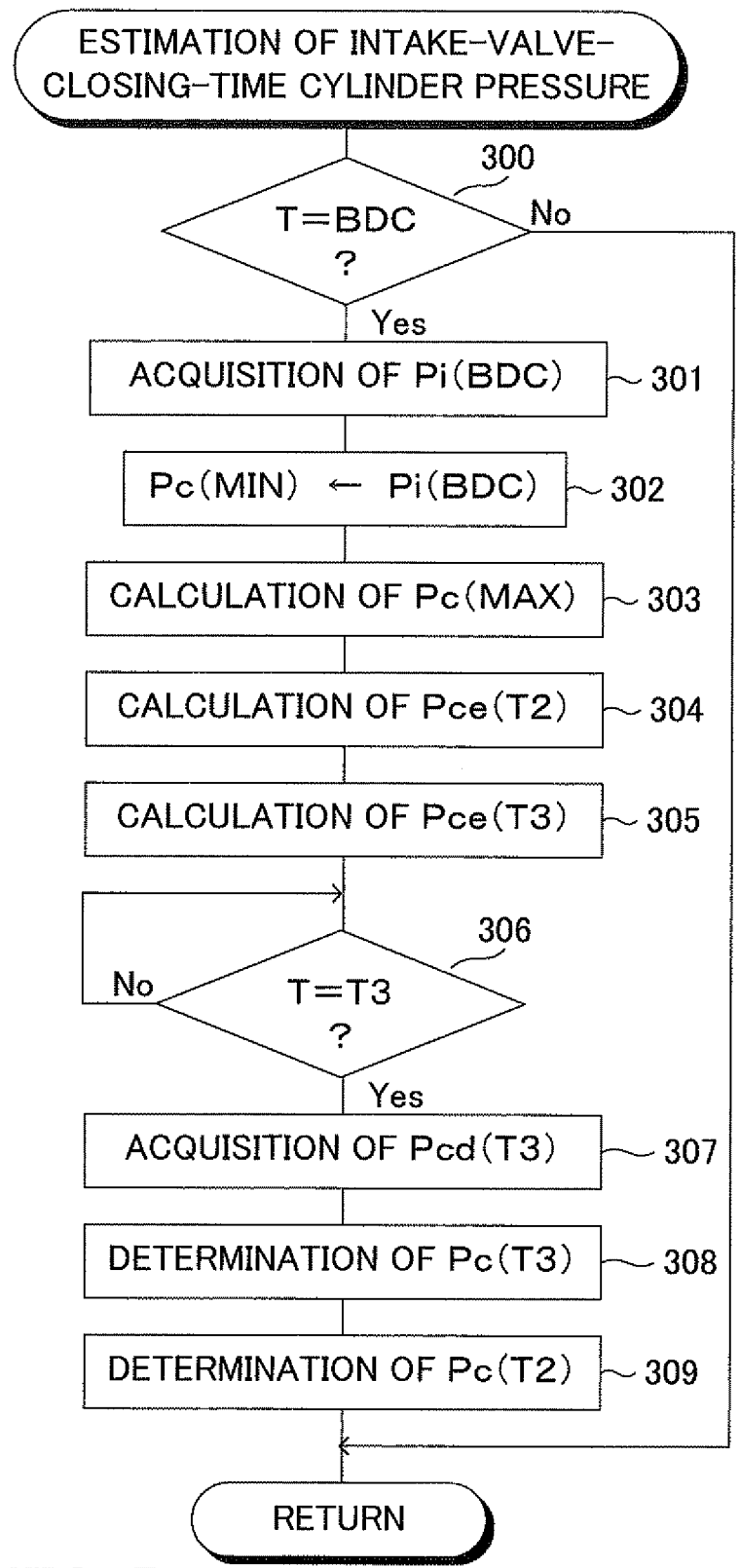
FIG. 7 is a view showing a flowchart for performing an estimation of the intake-valve-closing-time cylinder pressure according to the second embodiment.

Next, an example of the routine for performing the estimation of the intake-valve-closing-time cylinder pressure according to the second embodiment, will be explained. For the estimation of the intake-valve-closing-time cylinder pressure according to the second embodiment, for example, the flowchart shown in FIG. 7 is used. The routine of FIG. 7 is performed every a predetermined time period is elapsed.

When the routine of FIG. 7 starts, at the step 300, it is judged if the present time T is the intake bottom dead center BDC (T=BDC). In this regard, when it is judged that T=BDC, the routine proceeds to the step 301. On the other hand, when it is not judged that T=BDC, the routine is directly terminated.

When it is judged that T=BDC at the step 300 and then, the routine proceeds to the step 301, the intake pressure Pi(BDC) detected by the intake pressure sensor 63 is acquired. That is, thereby, the intake pressure Pi(BDC) detected by the intake pressure sensor 66 at the intake bottom dead center BDC is acquired. Next, at the step 302, the intake pressure Pi(BDC) acquired at the step 301 is set as the lower limit of the intake-valve-closing-time cylinder pressure Pc(MIN). Next, at the step 303, the upper limit of the intake-valve-closing-time cylinder pressure Pc(MAX) is calculated by the theoretical calculation on the basis of the intake pressure Pi(BDC) acquired at the step 301. Next, at the step 304, the pressures between the lower limit Pc(MIN) set at the step 302 and the upper limit Pc(MAX) calculated at the step 303 of the intake-valve-closing-time cylinder pressure, are calculated as the candidate values Pce(T2) of the intake-valve-closing-time cylinder pressure (i.e. the cylinder pressure at the intake-valve-closing time T2). Next, at the step 305, the candidate values Pce(T3) of the cylinder pressure at the post-intake-valve-closing time T3 (i.e. the post-intake-valve-closing-time cylinder pressure), are calculated by the theoretical calculation on the basis of the candidate values Pce(T2) of the intake-valve-closing-time cylinder pressure calculated at the step 304.

Next, at the step 306, it is judged if the present time T is the post-intake-valve-closing time T3 (T=T3). In this regard, when it is judged that T=T3, the routine proceeds to the step

307. On the other hand, when it is not judged that T=T3, the routine performs the step 306 again. That is, the routine performs the step 306 repeatedly until it is judged that T=T3 at the step 306.

When it is judged that T=T3 at the step 306 and then, the routine proceeds to the step 307, the cylinder pressure detected by the cylinder pressure sensor 63 is acquired as the detected post-intake-valve-closing-time cylinder pressure Pcd(T3) (i.e. the cylinder pressure at the post-intake-valve-closing time T3). Next, at the step 308, the candidate values Pce(T3) of the post-intake-valve-closing-time cylinder pressure calculated by the step 305, are compared with the detected post-intake-valve-closing-time cylinder pressure Pcd(T3) acquired at the step 307 and then, the candidate value Pce(T3) of the post-intake-valve-closing-time cylinder pressure which can be deemed to correspond to the detected post-intake-valve-closing-time cylinder pressure Pcd(T3), is determined as the actual cylinder pressure Pc(T3) at the post-intake-valve-closing time T3. Next, at the step 309, the candidate value Pce(T2) of the intake-valve-closing-time cylinder pressure used to calculate the actual cylinder pressure Pc(T3) determined at the step 308, is determined as the actual intake-valve-closing-time cylinder pressure Pc(T2) and then, the routine is terminated.

It should be noted that in the first and second embodiments, the intake pressure detected by the intake pressure sensor 66 at the bottom dead center BDC, is set as the lower limit of the intake-valve-closing-time cylinder pressure, while the cylinder pressure calculated by the theoretical calculation on the basis of the intake pressure detected as the cylinder pressure at the intake-valve-closing time T2 assuming that the intake valve 32 closes at the intake bottom dead center BDC, is set as the upper limit of the intake-valve-closing-time cylinder pressure and then, the pressures between the lower and upper limits of the intake-valve-closing-time cylinder pressure, are calculated as the candidate values of the intake-valve-closing-time cylinder pressure. According to this, as explained above, the pressure which is assuredly equal to or lower than the intake-valve-closing-time cylinder pressure, is set as the lower limit of the intake-valve-closing-time cylinder pressure, while the pressure which is assuredly equal to or higher than the intake-valve-closing-time cylinder pressure, is set as the upper limit of the intake-valve-closing-time cylinder pressure and therefore, the appropriate candidate values of the intake-valve-closing-time cylinder pressure are employed as the actual intake-valve-closing-time cylinder pressures. Therefore, it can be said that this fact is preferred in order to obtain the appropriate candidate values as the candidate values of the intake-valve-closing-time cylinder pressure as possible.

However, if the highly possible candidate values of the intake-valve-closing-time cylinder pressure can be calculated or a certain advantage can be obtained by a method other than the method of calculating the candidate values of the intake-valve-closing-time cylinder pressure, using the lower and upper limits of the intake-valve-closing-time cylinder pressure, in the first and second embodiments, the candidate values of the intake-valve-closing-time cylinder pressure may be calculated by using the other method in place of the method of calculating the candidate values of the intake-valve-closing-time cylinder pressure, using the lower and upper limits of the intake-valve-closing-time cylinder pressure.

Further, in the first and second embodiments, the intake pressure detected by the intake pressure sensor 66 at the intake bottom dead center BDC, is set as the lower limit of the intake-valve-closing-time cylinder pressure. That is, the lower limit of the intake-valve-closing-time cylinder pressure is set by using the intake pressure sensor 66. According to this, the lower limit of the intake-valve-closing-time cylinder pressure can be set by using the intake pressure sensor 66 which can be used for a purpose other than the purpose of the estimation of the intake-valve-closing-time cylinder pressure. Thus, it can be said that this fact is preferred in order to reduce the number of the parts as possible.

However, if the cylinder pressure can be detected or estimated at the bottom dead center BDC or a certain advantage can be obtained by a method other than the method of using the intake pressure sensor 66, in the first and second embodiments, the cylinder pressure detected or estimated by using the other method in place of the method of setting the intake pressure detected by the intake pressure sensor 66 at the intake bottom dead center BDC as the lower limit of the intake-valve-closing-time cylinder pressure, may be set as the lower limit of the intake-valve-closing-time cylinder pressure.

Further, in the first and second embodiments, the intake pressure at the intake bottom dead center BDC is set as the lower limit of the intake-valve-closing-time cylinder pressure. In this regard, the intake pressure at the intake bottom dead center BDC is assuredly equal to or lower than the intake-valve-closing-time cylinder pressure, compared with the intake pressure at the time after the intake bottom dead center BDC. Therefore, it can be said that this fact is preferred in order to obtain the appropriate candidate values as the candidate values of the intake-valve-closing-time cylinder pressure as possible.

However, if the time other than the intake bottom dead center BDC when the intake pressure is equal to or lower than the cylinder pressure at the intake-valve-closing-time, can be determined or a certain advantage can be obtained, in the first and second embodiments, the intake pressure detected by the intake pressure sensor 66 at the time other than the intake bottom dead center BDC, can be set as the lower limit of the intake-valve-closing-time cylinder pressure in place of setting the intake pressure detected by the intake pressure sensor 66 at the intake bottom dead center BDC as the lower limit of the intake-valve-closing-time cylinder pressure.

Further, in the first embodiment, the time before the fuel injection time (i.e. the time when the fuel is injected into the combustion chamber 25 from the fuel injector 37) is selected as the time of terminating the detection of the cylinder pressure by the cylinder pressure sensor 63 used to calculate the detected cylinder pressure movement to be compared with the candidates of the cylinder pressure movement (hereinafter, this time is the post-intake-valve-closing time T3 in the first embodiment and will be referred to as —time of the termination of the cylinder pressure detection—). In this regard, in the case that the time after the fuel injection time is selected as the time of the termination of the cylinder pressure detection, it is necessary to calculate the candidates of the cylinder pressure movement until the time after the fuel injection time by the theoretical calculation. However, in this case, it is necessary to consider the combustion of the fuel injected into the combustion chamber 25 from the fuel injector 37 in the theoretical calculation of the candidates of the cylinder pressure movement. This increases the load of the calculation in the theoretical calculation of the candidates of the cylinder pressure movement and decreases the accuracy of the candidates of the cylinder pressure movement calculated by the theoretical calculation. Therefore, it can be said that it is preferred that the time before the fuel injection time is selected as the time of the termination of the cylinder pressure detection in order to decrease the load of the calculation in the theoretical calculation of the candidates of the cylinder pressure movement as possible or in order to increase the accuracy of the candidates of the cylinder pressure movement calculated by the theoretical calculation as possible.

However, even when the candidates of the cylinder pressure movement until the time after the fuel injection time are calculated by the theoretical calculation, if the load of the calculation in the theoretical calculation can be permitted or the accuracy of the candidates of the cylinder pressure movement calculated by the theoretical calculation can be permitted or a certain advantage can be obtained, the time after the fuel injection time may be selected as the time of the termination of the cylinder pressure detection. Of course, even when the load of the calculation in the theoretical calculation of the candidates of the cylinder pressure movement, is larger than the permissible load or the accuracy of the candidates of the cylinder pressure movement calculated by the theoretical calculation, is lower than the permissible accuracy, if the candidates of the cylinder pressure movement until the time after the fuel injection time are needed, in the first embodiment, the time after the fuel injection time is selected as the time of the termination of the cylinder pressure detection.

Further, in the first embodiment, the time immediately before the fuel injection time is selected as the time of the termination of the cylinder pressure detection. According to this, the detected cylinder pressure movement for the long time period as possible is calculated and the candidates of the cylinder pressure movement for the long time period as possible is calculated by the theoretical calculation, while the load of the calculation in the theoretical calculation of the candidates of the cylinder pressure movement as explained above is decreased as possible. Then, in this case, the detected cylinder pressure movement for the long time period is compared with the candidates of the cylinder pressure movement for the long time period. Thus, the candidate of the cylinder pressure movement extremely close to the actual cylinder pressure movement, is determined as the actual cylinder pressure movement. Therefore, it can be said that this fact is preferred in order to determine as the actual cylinder pressure movement the candidate of the cylinder pressure movement close to the actual cylinder pressure movement as possible.

However, even when the time relatively largely before the fuel injection time is selected as the time of the termination of the cylinder pressure detection, if the candidate of the cylinder pressure movement close to the actual cylinder pressure movement as possible can be determined as the actual cylinder pressure movement or a certain advantage can be obtained, in the first embodiment, the time relatively largely before the fuel injection time may be selected as the time of the termination of the cylinder pressure detection.

Further, in the second embodiment, the time before the fuel injection time is selected as the time when the detected post-intake-valve-closing-time cylinder pressure to be compared with the candidate values of the post-intake-valve-closing-time cylinder pressure, is detected by the cylinder pressure sensor 63 (i.e. the post-intake-valve-closing time T3 in the second embodiment and the time of the termination of the cylinder pressure detection). In this regard, in the case that the time after the fuel injection time is selected as the time of the termination of the cylinder pressure detection, it is necessary to calculate the candidate values of the post-intake-valve-closing-time cylinder pressure at the time after the fuel injection time by the theoretical calculation. However, in this case, as explained above, in the theoretical calculation of the candidate values of the post-intake-valve-closing-time cylinder pressure, it is necessary to consider the combustion of the fuel injected into the combustion chamber 25 from the fuel injector 37. This increases the load of the calculation in the theoretical calculation of the candidate values of the post-intake-valve-closing-time cylinder pressure and decreases the accuracy of the candidate values of the post-intake-valve-closing-time cylinder pressure calculated by the theoretical calculation. Therefore, it can be said that it is preferred to select the time before the fuel injection time as the time of the termination of the cylinder pressure detection in order to decrease the load of the calculation in the theoretical calculation of the candidate values of the post-intake-valve-closing-time cylinder pressure as possible and increase the accuracy of the candidate values of the post-intake-valve-closing-time cylinder pressure calculated by the theoretical calculation as possible.

However, even when the candidate values of the post-intake-valve-closing-time cylinder pressure at the time after the fuel injection time, is calculated by the theoretical calculation, if the load of the calculation in the theoretical calculation can be permitted or the accuracy of the candidate values of the post-intake-valve-closing-time cylinder pressure calculated by the theoretical calculation can be permitted, in the first embodiment, the time after the fuel injection time may be selected as the time of the termination of the cylinder pressure detection. Of course, even when the load of the calculation in the theoretical calculation of the candidate values of the post-intake-valve-closing-time cylinder pressure, is larger than the permissible load or the accuracy of the candidate values of the post-intake-valve-closing-time cylinder pressure calculated by the theoretical calculation is lower than the permissible accuracy, if the candidate values of the post-intake-valve-closing-time cylinder pressure at the time after the fuel injection time, is needed, in the first embodiment, the time after the fuel injection time may be selected as the time of the termination of the cylinder pressure detection.

Further, in the second embodiment, the time immediately before the fuel injection time is selected as the time of the termination of the cylinder pressure detection. According to this, the cylinder pressure detected by the cylinder pressure sensor 63 at the late time as possible is compared with the candidate values of the post-intake-valve-closing-time cylinder pressure, while the load of the calculation in the theoretical calculation of the candidate values of the post-intake-valve-closing-time cylinder pressure as explained above, is decreased as possible. As explained relating to the first embodiment, in particular, this is advantageous in the case that the cylinder pressure sensor 63 has a property that it can detect the high pressure with the high accuracy, however it cannot detect the low pressure with the high accuracy.

That is, in the case that the cylinder pressure sensor 63 has the above-explained property, the cylinder pressure sensor 63 can detect the pressure with the high accuracy as the pressure becomes high. Therefore, in the case that the time before the fuel injection time is selected as the time of the termination of the cylinder pressure detection, the cylinder pressure detected by the cylinder pressure sensor 63 exactly corresponds to the actual cylinder pressure as the time of the termination of the cylinder pressure detection is close to the fuel injection time. Therefore, when the time of the termination of the cylinder pressure detection is the time immediately before the fuel injection time, the cylinder pressure detected by the cylinder pressure sensor 63 at the time of the termination of the cylinder pressure detection, corresponds to the actual cylinder pressure at the time of the termination of the cylinder pressure detection more exactly. Then, the pressure in the combustion chamber 25 at the intake-valve-closing time is estimated on the basis of the candidate value of the post-intake-valve-closing-time cylinder pressure which exactly corresponds to the actual cylinder pressure at the time of the termination of the cylinder pressure detection. Therefore, in the second embodiment, even when the cylinder pressure sensor 63 has the above-explained property, there is an advantage that the pressure in the combustion chamber 25 at the intake-valve-closing time can be estimated exactly.

Further, in the first embodiment, a plurality of the candidates of the cylinder pressure movement are calculated in the simultaneous parallel manner (i.e. by the parallel calculation). According to this, the predetermined number of the candidates of the cylinder pressure movement are calculated promptly and therefore, the predetermined number of the candidates of the cylinder pressure movement are assuredly calculated by the post-intake-valve-closing time T3. Therefore, it can be said that this face is preferred in order to assuredly calculate the predetermined number of the candidates of the cylinder pressure movement by the post-intake-valve-closing time T3.

However, if the predetermined number of the candidates of the cylinder pressure movement can be assuredly calculated by the post-intake-valve-closing time T3 or there is the other advantage, in the first embodiment, in place of the calculation of the candidates of the cylinder pressure movement in the simultaneous parallel manner, the candidates of the cylinder pressure movement may be calculated by the sequential calculation of the candidates of the cylinder pressure movement.

Further, in the second embodiment, the candidate values of the post-intake-valve-closing-time cylinder pressure are calculated in the simultaneous parallel manner (i.e. by the parallel calculation). According to this, the predetermined number of the candidate values of the post-intake-valve-closing-time cylinder pressure are calculated promptly and therefore, the candidate values of the post-intake-valve-closing-time cylinder pressure are assuredly calculated by the post-intake-valve-closing time T3. Therefore, it can be said that this fact is preferred in order to assuredly calculate the predetermined number of the candidate values of the post-intake-valve-closing-time cylinder pressure by the post-intake-valve-closing time T3.

However, if the predetermined number of the candidate values of the post-intake-valve-closing-time cylinder pressure by the post-intake-valve-closing time T3, can be assuredly calculated or there is the other advantage, in the second embodiment, in place of the simultaneous parallel calculation of the candidate values of the post-intake-valve-closing-time cylinder pressure, a plurality of the post-intake-valve-closing-time cylinder pressures may be calculated by sequentially calculating the candidate values of the post-intake-valve-closing-time cylinder pressure.

Further, relating to the first embodiment, it is explained that the cylinder pressure sensor 63 has a property that it can detect the high pressure with the high accuracy and cannot detect the low pressure with the high accuracy. However, in the first embodiment, also in the case that the cylinder pressure sensor 63 has a property different from the above-mentioned property, the actual pressure in the combustion chamber 25 at the intake-valve-closing time (i.e. the time when the intake valve closes) can be exactly estimated.

That is, in the first embodiment, the detected cylinder pressure movement (i.e. the movement of the cylinder pressure detected by the cylinder pressure sensor 63 until a certain time period from the intake-valve-closing time is elapsed), is calculated on the basis of the cylinder pressure detected by the cylinder pressure sensor 63 until the above-mentioned time period from the intake-valve-closing time is elapsed. In this regard, the calculated detected cylinder pressure movement does not completely correspond to the actual movement of the actual cylinder pressure, however, it generally corresponds to the actual movement of the cylinder pressure. Then, in the first embodiment, the detected cylinder pressure movement which generally corresponds to the actual movement of the cylinder pressure, is compared with the cylinder pressure movement candidates (i.e. the possible movement of the cylinder pressure during the above-mentioned time period from the intake-valve-closing time, which is calculated by the theoretical calculation), and then, the candidate of the cylinder pressure movement which can be deemed to correspond to the detected cylinder pressure movement, can be determined. That is, according to this, even when there is a cylinder pressure which does not exactly correspond to the actual cylinder pressure among the cylinder pressures detected by the cylinder pressure sensor 63, the cylinder pressures detected by the cylinder pressure sensor 63 are totally compared with the candidates of the cylinder pressure movement and therefore, it can be said that the candidate of the cylinder pressure movement determined as the candidate of the cylinder pressure movement which is deemed to correspond to the detected cylinder pressure movement, is extremely close to the actual cylinder pressure movement.

Therefore, in the first embodiment, in the case that the cylinder pressure sensor 63 has a property different from the above-mentioned property, the actual pressure in the combustion chamber 25 at the intake-valve-closing time can be exactly estimated.

Further, the number of the candidates of the calculated cylinder pressure movement in the first embodiment and the number of the calculated candidate values of the post-intake-valve-closing-time cylinder pressure in the second embodiment are set, according to the ability of the calculation of the electronic control unit 70.

Further, in the first embodiment, the detected cylinder pressure movement calculated on the basis of the pressure in the combustion chamber 25 detected by the cylinder pressure sensor 63, is compared with the candidates of the cylinder pressure movement calculated by the theoretical calculation and then, the candidate of the cylinder pressure movement which can be deemed to correspond to the detected cylinder pressure movement, is determined as the actual movement of the cylinder pressure, while in the second embodiment, the detected post-intake-valve-closing-time cylinder pressure which is the pressure in the combustion chamber 25 detected by the cylinder pressure sensor 63 at the post-intake-valve-closing time T3, is compared with the candidate values of the post-intake-valve-closing-time cylinder pressure calculated by the theoretical calculation and then, the candidate value of the post-intake-valve-closing-time cylinder pressure which can be deemed to correspond to the detected post-intake-valve-closing-time cylinder pressure, is determined as the actual cylinder pressure at the post-intake-valve-closing time. That is, in the first and second embodiments, the actual movement of the cylinder pressure and the actual post-intake-valve-closing-time cylinder pressure are determined indirectly on the basis of the pressure in the combustion chamber 25 detected by the cylinder pressure sensor 63. As explained above, the accuracy of the detection of the cylinder pressure sensor 63 changes, depending on the pressure in the combustion chamber 25. However, according to the first and second embodiments, since the actual movement of the cylinder pressure and the actual post-intake-valve-closing-time cylinder pressure are determined by indirectly using the cylinder pressure detected by the cylinder pressure sensor 63, even if the cylinder pressure detected by the cylinder pressure sensor 63 is slightly different from the actual cylinder pressure, the cylinder pressure detected by the cylinder pressure sensor 63 is used only for determining the candidate of the cylinder pressure movement and the candidate value of the post-intake-valve-closing-time cylinder pressure which correspond to the actual cylinder pressure movement and the actual post-intake-valve-closing-time cylinder pressure, respectively among the candidates of the cylinder pressure movement and the candidate values of the post-intake-valve-closing-time cylinder pressure. Therefore, according to the first and second embodiments, even if the cylinder pressure detected by the cylinder pressure sensor 63 is slightly different from the actual cylinder pressure, the actual movement of the cylinder pressure or the actual post-intake-valve-closing-time cylinder pressure is exactly determined and as a result, the actual intake-valve-closing-time cylinder pressure can be exactly determined.

Further, the candidate values of the intake-valve-closing-time cylinder pressure used for calculating the candidates of the cylinder pressure movement in the first embodiment and the candidate values of the intake-valve-closing-time cylinder pressure used for calculating the candidate values of the post-intake-valve-closing-time cylinder pressure in the second embodiment, are limited between the lower and upper limits of the intake-valve-closing-time cylinder pressure. By limiting the candidate values of the intake-valve-closing-time cylinder pressure as explained above, the number of the candidates of the cylinder pressure movement to be calculated by the theoretical calculation in the first embodiment and the number of the candidate values of the post-intake-valve-closing-time cylinder pressure to be calculated by the theoretical calculation in the second embodiment, are decreased.

Further, for the following reason, it can be said that the accuracy of the calculation of the candidates of the cylinder pressure movement calculated by the theoretical calculation in the first embodiment and the accuracy of the calculation of the candidate values of the post-intake-valve-closing-time cylinder pressure calculated by the theoretical calculation in the second embodiment, are high. That is, it is difficult to exactly obtain the flow coefficient regarding the flow of the air which flows into the combustion chamber 25 from the intake port 31 by an experiment, etc. and the huge load is necessary for exactly obtaining the flow coefficient by an experiment, etc. Therefore, even when the flow coefficient regarding the flow of the air which flows into the combustion chamber 25 from the intake port 31, is obtained, the flow coefficient does not exactly indicate the flow coefficient regarding the flow of the air which flows into the combustion chamber 25 from the intake port 31. Thus, in the case that it is necessary to use the above-mentioned flow coefficient in order to calculate the candidates of the cylinder pressure movement by the theoretical calculation in the first embodiment or in order to calculate the candidate values of the post-intake-valve-closing-time cylinder pressure by the theoretical calculation in the second embodiment, it cannot be said that the calculated candidates of the cylinder pressure movement and the calculated candidate values of the post-intake-valve-closing-time cylinder pressure, are exact ones. However, it is unnecessary to use the above-mentioned flow coefficient in order to calculate the candidates of the cylinder pressure movement by the theoretical calculation in the first embodiment or in order to calculate the candidate values of the post-intake-valve-closing-time cylinder pressure by the theoretical calculation in the second embodiment. For the reason, it can be said that the accuracy of the calculation of the candidates of the cylinder pressure movement calculated by the theoretical calculation in the first embodiment and the accuracy of the calculation of the candidate values of the post-intake-valve-closing-time cylinder pressure calculated by the theoretical calculation in the second embodiment, are high.

Further, in the first and second embodiments, when the post-intake-valve-closing time T3 is referred to as —the time after the intake-valve-closing time by a predetermined time period—and the intake bottom dead center BDC is referred to as —the time before the intake-valve-closing time by a predetermined time period—, in general, the predetermined time period which defines the post-intake-valve-closing time T3, is set to be longer than the predetermined time period which defines the intake bottom dead center BDC. However, as necessity, the predetermined time periods may be equal to each other.

Further, the first and second embodiments are ones that the invention applies to the compression ignition type of the internal combustion engine, however, the invention can applies to the spark ignition type of the internal combustion engine.

EXPLANATION OF REFERENCE SYMBOLS

10 . . . Internal combustion engine, 25 . . . Combustion chamber, 32 . . . Intake valve, 37 . . . Fuel injector, 63 . . . Cylinder pressure sensor, 66 . . . Intake pressure sensor, 70 . . . Electronic control unit

The invention claimed is:

1. A cylinder pressure estimation device of an engine having a cylinder pressure sensor for detecting a pressure in a combustion chamber as a cylinder pressure, comprising:
    means for calculating as candidate values of an intake-valve-closing-time cylinder pressure, a plurality of candidate values of a possible pressure in said combustion chamber at an intake-valve-closing time which is a time when an intake valve closes;
    means for calculating as candidates of a cylinder pressure movement, a plurality of candidates of a possible movement of the pressure in said combustion chamber from said intake-valve-closing time to a post-intake-valve-closing time which is a time after said intake-valve-closing time by a predetermined time period on the basis of said candidate values of the intake-valve-closing-time cylinder pressure calculated by said intake-valve-closing-time cylinder pressure candidate value calculation means;
    means for calculating as a detected cylinder pressure movement, a movement of the cylinder pressure detected by said cylinder pressure sensor from said intake-valve-closing time to said post-intake-valve-closing time; and
    means for comparing said candidates of the cylinder pressure movement calculated by said cylinder pressure movement candidate calculation means with said detected cylinder pressure movement calculated by said detected cylinder pressure movement calculation means, determining the candidate of the cylinder pressure movement to be deemed to correspond to said detected cylinder pressure movement among said candidates of the cylinder pressure movement and determining as the pressure in said combustion chamber at said intake-valve-closing time, the candidate value of the intake-valve-closing-time cylinder pressure used for calculating said determined candidate of the cylinder pressure movement by said cylinder pressure movement candidate calculation means.

2. The cylinder pressure estimation device as set forth in claim 1, wherein said engine has a fuel injector for directly injecting a fuel into said combustion chamber and said post-intake-valve-closing time is a time before the fuel is injected from said fuel injector into said combustion chamber.

3. The cylinder pressure estimation device as set forth in claim 1, wherein said cylinder pressure movement candidate calculation means calculates a plurality of the candidates of the cylinder pressure movement by a parallel calculation.

4. The cylinder pressure estimation device as set forth in claim 1, wherein the device further comprises means for calculating as a lower limit of the intake-valve-closing-time cylinder pressure, the pressure in said combustion chamber at an pre-intake-valve-closing time which is a time before said intake-valve-closing time by a predetermined time period and calculating as an upper limit of said intake-valve-closing-time cylinder pressure, the pressure in said combustion chamber at said intake-valve-closing time assuming that said intake valve closes at said pre-intake-valve-closing time, and said intake-valve-closing-time cylinder pressure candidate value calculation means calculates as said candidate values of the intake-valve-closing-time cylinder pressure, the pressures between said lower and upper limits calculated by said upper and lower limit calculation means.

5. The cylinder pressure estimation device as set forth in claim 4, wherein said engine further has an intake pressure sensor for detecting as an intake pressure, a pressure of an air which flows into said combustion chamber, and said upper and lower limit calculation means calculates as said lower limit, the intake pressure detected by said intake pressure sensor at said pre-intake-valve-closing-time.

6. The cylinder pressure estimation device as set forth in claim 4, wherein said pre-intake-valve-closing time is the intake bottom dead center.

7. A cylinder pressure estimation device of an engine having a cylinder pressure sensor for detecting a pressure in a combustion chamber as a cylinder pressure, comprising:
    means for calculating as candidate values of an intake-valve-closing-time cylinder pressure, a plurality of candidate values of a possible pressure in said combustion chamber at an intake-valve-closing time which is a time when an intake valve closes;
    means for calculating as candidate values of a post-intake-valve-closing cylinder pressure, a plurality of candidate values of a possible pressure in said combustion chamber at a post-intake-valve-closing time which is a time after said intake-valve-closing time by a predetermined time period on the basis of said candidate values of the intake-valve-closing-time cylinder pressure calculated by said intake-valve-closing-time cylinder pressure candidate value calculation means; and
    means for comparing said candidate values of the post-intake-valve-closing-time cylinder pressure calculated by said post-intake-valve-closing-time cylinder pressure candidate value calculation means with a cylinder pressure detected as a post-intake-valve-closing-time cylinder pressure by said cylinder pressure sensor at said post-intake-valve-closing time, determining the candidate value of the post-intake-valve-closing-time cylinder pressure to be deemed to correspond to said post-intake-valve-closing-time cylinder pressure among said candidate values of the post-intake-valve-closing-time cylinder pressure and determining as the pressure in said combustion chamber at said intake-valve-closing time, the candidate value of the intake-valve-closing-time cylinder pressure used for calculating said determined candidate value of the intake-valve-closing-time cylinder pressure by said post-intake-valve-closing-time cylinder pressure candidate value calculation means.

8. The cylinder pressure estimation device as set forth in claim 7, wherein said engine has a fuel injector for directly injecting a fuel into said combustion chamber and said post-intake-valve-closing time is a time before the fuel is injected from said fuel injector into said combustion chamber.

9. The cylinder pressure estimation device as set forth in claim 7, wherein said post-intake-valve-closing-time cylinder pressure candidate value calculation means calculates a plurality of the candidate values of the post-intake-valve-closing-time cylinder pressure by a parallel calculation.

10. The cylinder pressure estimation device as set forth in claim 7, wherein the device further comprises means for calculating as a lower limit of the intake-valve-closing-time cylinder pressure, the pressure in said combustion chamber at an pre-intake-valve-closing time which is a time before said intake-valve-closing time by a predetermined time period and calculating as an upper limit of said intake-valve-closing-time cylinder pressure, the pressure in said combustion chamber at said intake-valve-closing time assuming that said intake valve closes at said pre-intake-valve-closing time, and said intake-valve-closing-time cylinder pressure candidate value calculation means calculates as said candidate values of the intake-valve-closing-time cylinder pressure, the pressures between said lower and upper limits calculated by said upper and lower limit calculation means.

11. The cylinder pressure estimation device as set forth in claim 10, wherein said engine further has an intake pressure sensor for detecting as an intake pressure, a pressure of an air which flows into said combustion chamber, and said upper and lower limit calculation means calculates as said lower limit, the intake pressure detected by said intake pressure sensor at said pre-intake-valve-closing-time.

12. The cylinder pressure estimation device as set forth in claim 10, wherein said pre-intake-valve-closing time is the intake bottom dead center.

13. A cylinder pressure estimation device of an engine having a cylinder pressure sensor for detecting a pressure in a combustion chamber as a cylinder pressure,
    wherein a plurality of candidate values of a possible pressure in said combustion chamber at an intake-valve-closing time which is a time when an intake valve closes, is calculated as candidate values of an intake-valve-closing-time cylinder pressure;
    a plurality of candidates of a possible movement of the pressure in said combustion chamber from said intake-valve-closing time to a post-intake-valve-closing time which is a time after said intake-valve-closing time by a predetermined time period on the basis of said candidate values of the intake-valve-closing-time cylinder pressure, is calculated as candidates of a cylinder pressure movement;
    a movement of the cylinder pressure detected by said cylinder pressure sensor from said intake-valve-closing time to said post-intake-valve-closing time is calculated as a detected cylinder pressure movement; and
    said candidates of the cylinder pressure movement is compared with said detected cylinder pressure movement, the candidate of the cylinder pressure movement to be deemed to correspond to said detected cylinder pressure movement among said candidates of the cylinder pressure movement is determined and the candidate value of the intake-valve-closing-time cylinder pressure used for calculating said determined candidate of the cylinder pressure movement is determined as the pressure in said combustion chamber at said intake-valve-closing time.

14. A cylinder pressure estimation device of an engine having a cylinder pressure sensor for detecting a pressure in a combustion chamber as a cylinder pressure,
    wherein a plurality of candidate values of a possible pressure in said combustion chamber at an intake-valveclosing time which is a time when an intake valve closes, is calculated as candidate values of an intake-valve-closing-time cylinder pressure;

a plurality of candidate values of a possible pressure in said combustion chamber at a post-intake-valve-closing time which is a time after said intake-valve-closing time by a predetermined time period on the basis of said candidate values of the intake-valve-closing-time cylinder pressure is calculated as candidate values of a post-intake-valve-closing cylinder pressure; and said candidate values of the post-intake-valve-closing-time cylinder pressure is compared with a cylinder pressure detected as a post-intake-valve-closing-time cylinder pressure by said cylinder pressure sensor at said post-intake-valve-closing time, the candidate value of the post-intake-valve-closing-time cylinder pressure to be deemed to correspond to said post-intake-valve-closing-time cylinder pressure among said candidate values of the post-intake-valve-closing-time cylinder pressure is determined and the candidate value of the intake-valve-closing-time cylinder pressure used for calculating said determined candidate value of the intake-valve-closing-time cylinder pressure is determined as the pressure in said combustion chamber at said intake-valve-closing time.

* * * * *